United States Patent [19]

Petrilla et al.

[11] 3,832,710

[45] Aug. 27, 1974

[54] NOISE INJECTION IMPLEMENTATION FOR CONSTANT FALSE ALARM RATE RADAR

[75] Inventors: Anthony D. Petrilla, Madison, Wis.; Edwin B. Smith, Medford Lakes, N.J.

[73] Assignee: The United States of America as represented by the Secretary of the Navy, Washington, D.C.

[22] Filed: Apr. 4, 1973

[21] Appl. No.: 347,951

[52] U.S. Cl. ............................................. 343/5 SM
[51] Int. Cl. ............................................. G01s 7/34
[58] Field of Search ................................. 343/5 SM

[56] References Cited
UNITED STATES PATENTS
3,765,020    10/1973    Seager et al. .................... 343/5 SM Primary Examiner—T. H. Tubbesing
Attorney, Agent, or Firm—R. S. Sciascia; P. Schneider; E. LaRoche

[57] ABSTRACT

A noise-injection system for use in a radar receiver which employs STC. Noise is injected into the receiver channel to maintain the noise level in the receiver constant as a function of range. This results in a constant signal-to-noise ratio and a constant probability of detecting a minimum-size target. The noise-injection system is controlled by the STC function generator.

8 Claims, 1 Drawing Figure

PATENTED AUG 27 1974     3,832,710
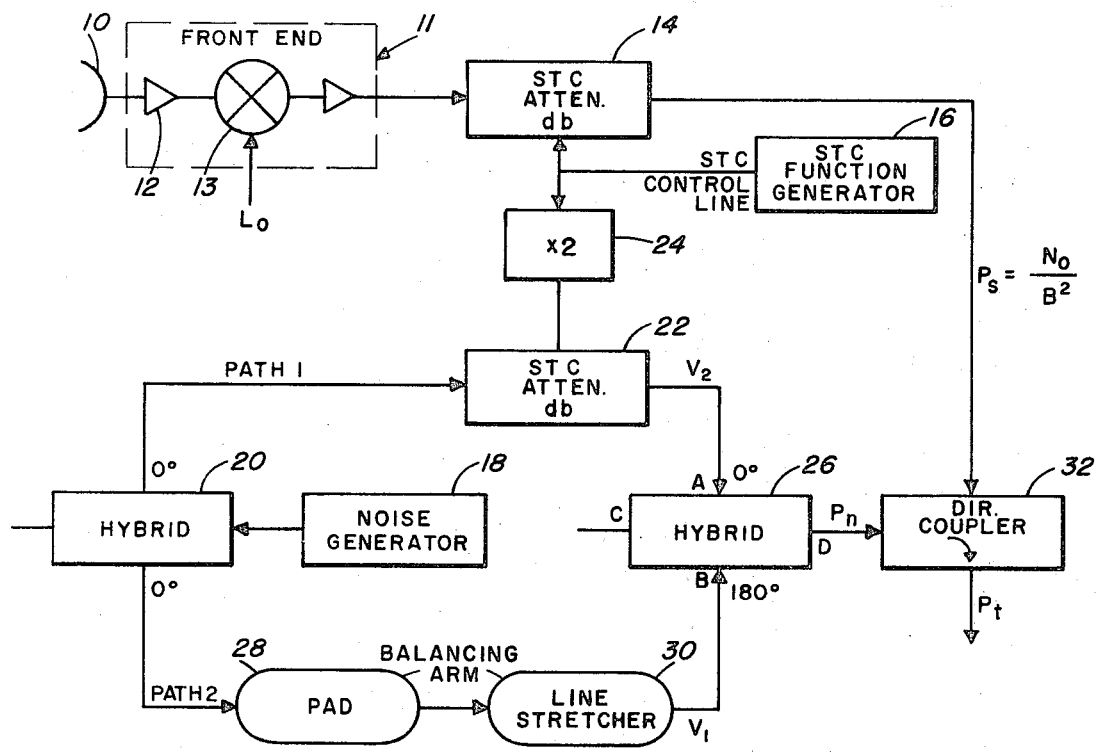

3,832,710

NOISE INJECTION IMPLEMENTATION FOR CONSTANT FALSE ALARM RATE RADAR

BACKGROUND OF THE INVENTION

The present invention relates generally to radar receivers and more particularly to radar receivers employing sensitivity-time control (STC) circuits.

The amplitude of the reflected signal of a radar pulse is proportional, approximately, to the reciprocal of the fourth power of the range of the target. Therefore, if the gain of the receiver is set high enough to detect distant targets, it may be overloaded by near-by targets. In order to maintain the signal levels at a relatively constant level, the gain of the receiver is varied as a function of time so that the receiver gain is decreased for targets at close ranges. This is STC and is accomplished by inserting an attenuator in the receiver chain (usually in the I.F. circuits) and controlling the amount of attenuation as a function of range.

One of the problems presented by the use of STC in a receiver is that a varying signal-to-noise ratio for a given target cross section is produced. The signal-to-noise ratio for a given target cross section varies as a function of the STC. This can be clearly understood by considering that the noise varies directly with the gain of the receiver, the gain being controlled by STC. A target of given cross-section at 5 miles will produce a signal of substantially the same amplitude as the same target at 50 miles, but the noise will be much less at the 5 mile range. Therefore, the signal-to-noise ratio at 5 miles is greater than at 50 miles for the same target. This varying signal-to-noise ratio presents a problem because it results in an ever-increasing probability of detecting small "no threat" targets (false alarms) as the range is decreasing.

SUMMARY OF THE INVENTION

According to the present invention, a constant probability of detection for a minimum size "threat" target is maintained by providing a constant signal-to-noise ratio for a given target cross-section at all ranges. This is accomplished by maintaining a constant noise level as a function of range in the receiver. Since the STC maintains a constant signal level as a function of range in the receiver, the result is a constant signal-to-noise ratio as a function of range. The constant noise level is maintained by injecting noise into the receiver, the amount of noise being controlled by the same generated control signal that controls the STC attenuator. In this way, as the noise level in the receiver is decreasing with decreasing range due to STC, noise is injected into the receiver to keep the noise level constant.

OBJECTS OF THE INVENTION

An object of the present invention is to provide a radar receiver having STC with a constant probability of detecting a minimum size target.

Another object of the invention is to inject noise into a STC radar receiver as a function of STC to keep the signal-to-noise ratio constant.

Other objects, advantages and novel features of the present invention will become apparent from the following detailed description of the invention when considered in conjunction with the accompanying drawings.

BRIEF DESCRIPTION OF THE DRAWING

The FIGURE shows a system for injecting noise into a radar receiver as a function of STC.

DESCRIPTION OF THE PREFERRED EMBODIMENT

Referring to the figure, radar receiving antenna 10 receives reflected energy and feeds it as an electrical signal to receiver front-end 11 which includes RF amplifier 12 and mixer 13. The signal, now at IF, is passed through STC attenuator 14 which is controlled in the well-known manner by STC function generator 16.

The noise-injection circuit comprises a bridge circuit fed by noise generator 18. The noise signal is divided into two in-phase portions by hybrid 20. One portion follows path 1 through attenuator 22 to port A of hybrid 26. The other portion follows path 2 through pad 28 and line stretcher 30 to port B of hybrid 26. Summing device 32, which may be a directional coupler, is inserted into the receiver chain and is connected to port D of hybrid 26 and to STC attenuator 14. Attenuator 22 is connected to the STC function generator 16 by means of multiplier or amplifier 24.

The noise power of the main signal channel is decreased by the STC attenuation function as follows:

1. $P_s = N_o/B^2$, where
   $B$ = STC attenuation as a voltage ratio
   $N_o$ = main signal channel nose power
   $P_s$ = noise power as a function of STC attenuation.

To maintain noise power constant as a function of STC, noise must be injected so that the sum of the main signal noise power and injected noise power $P_n$ is equal to $N_o$ or:

2. $P_s + P_n \; N_o$
   since $P_s = N_o/B^2$
   then
3. $P_n = N_o - N_o/B^2$
4. $P_n = N_o (1 - 1/B^2)$ where $P_n$ is the injected noise power, neglecting the coupling coefficient of the summing device 32.

The noise injection circuit of the figure is a balanced RF bridge where the signal is nulled at point D when the bridge is balanced. The bridge may be balanced by adjusting the amplitude, by means of pad 28, and the phase or time delay, by means of line stretcher 30, of the noise signal in path 2 so that the noise signals at points A and B of hybrid 26 result in a null signal at point D. The exact phase relationship of the two noise signals depends on the type of hybrid used. As shown in the drawing, the signals are 180° out of phase. If a quadrature hybrid were used, the signals could be adjusted to be 90° out of phase.

The bridge will be balanced when the two noise signal voltages shown in the figure as $V_1$ and $V_2$, are equal in amplitude and 180° out of phase. The bridge is adjusted so that it is balanced, and a null appears at point D, when the output of the STC function generator is at its minimum. This is the time when the STC attenuation is at a minimum and there is no need to inject noise. The noise signal voltage $V_2$ arrives at point A via attenuator 22, which changes attenuation by the square of the STC attenuator function due to component 24, which will be further discussed below. As attenuation is inserted by the STC function generator, the noise signal $V_2$ is decreased by $1/B^2$. The voltage appearing at point D will be:

5. $V_D = K(V_1 - V_2/B^2)$ where K is a constant of proportionality dependent on the characteristics of the hybrid. For the type of hybrid shown in the figure, $K = 0.707$.

Since the initial conditions were $V_1 = V_2$

6. $V_D = 0.707 V_1 (1 - 1/B^2)$. Substituting into (6) the general formula

Power $= V^2/R$, or $V = \sqrt{RP}$, with the power of noise source 18 being $4 N_o$, 7. $V_D = 0.707 \sqrt{RN_o} (1 - 1/B_2)$. The injected noise power $P_n$ is then 8. $V_D^2/R = N_o (1 - 1/B^2)^2 = P_n$, or 9. $P_n = N_o (1 - 2/B^2 + 1/B^4)$.

This is very close to the optimum $P_n$ of Equation (4). The total noise power at the output of summing device 32 is the sum of the injected noise power $P_n$ and main channel noise power $P_s$ shown in Equation (2) and repeated here.

2. $P_t = P_n + P_s$. Substituting Equations (1) and (9),

10. $P_t = N_o (1 - 1/B^2 + 1/B_4)$. The error will be:

11. $E = P_t/N_o = 1 - 1/B^2 + 1/B^4 = B^4 - B^2 + 1/B^4$

Differentiating (11) and setting equal to zero, the maximum error is $\pm 0.6$dB. That is, for all values of B, the total noise power will remain constant to within $\pm 0.6$ db.

In order for the noise signal voltage $V_2$ to vary in correspondence with the main channel noise power, it is necessary that the attenuation voltage ration increase as the square of the STC function; or, stated another way, the attenuation ratio in db must increase at twice the rate of the STC function. This is shown by the $B^2$ term in Equation (1). The squaring or doubling function is accomplished by component 24. If the attenuator 14 has a linear transfer curve of control voltage vs. db attenuation, as has a pin diode attenuator, with time and voltage shaped prior to the attenuator, then a linear amplifier with a gain of two is used as component 24, and an attenuator with similar characteristics is used for the noise voltage attenuator 22. If a digital attenuator is used in the STC circuit with the STC function generated by a computer, a similar attenuator may be used in the noise injection circuit and may be digitally multiplied by two in the known manner.

Obviously, many modification and variations of the present invention are possible in light of the above teachings. It is therefore to be understood that, within the scope of the appended claims, the invention may be practiced otherwise than as specifically described.

What is claimed is:

1. In a radar receiver of the type having an attenuator in the main signal channel and an STC function generator controlling the attenuator, whereby the signal level in the main signal channel is maintained constant at all ranges, means connected to the STC function generator for maintaining the noise level in the main signal channel constant at all ranges, said noise level maintaining means including bridge means and a noise generator connected to feed its signal into said bridge, said bridge having an attenuation arm and a voltage amplitude-and-phase adjusting arm, the noise voltage outputs from each arm being initially balanced, the attenuation of the attenuating arm being controlled by said STC function generator, the output of said bridge being fed into the main signal channel.

2. The combination of claim 1, wherein:
said attenuating arm comprises an attenuator, and
said voltage amplitude-and-phase adjusting arm comprises a pad and a line stretcher in series.

3. The combination of claim 2, wherein said bridge further includes a hybrid coupler having no phase shift to whose input the noise generator is coupled and whose outputs go to the attenuator and the pad, and a hybrid coupler having 0° and 180° phase shift arms to which the outputs of said attenuator and said line stretcher are fed, the output of the latter hybrid being the bridge output.

4. In a radar receiver of the type having an attenuator in the main signal channel and a STC function generator controlling the attenuator, whereby the target signal level in the main signal channel is maintained constant at all ranges, the improvement which comprises:
means connected to the STC function generator for maintaining the noise level in the main signal channel constant at all ranges,
said noise level maintaining means comprising:
a noise signal generator;
a second attenuator, controlled by said STC function generator, connected to the noise signal generator for receiving the noise signal and attenuating it, and,
means connected to the second attenuator for coupling the attenuated noise signal into the main signal channel.

5. In a radar receiver of the type having an attenuator in the main signal channel and a STC function generator controlling the attenuator, whereby the target signal level in the main signal channel is maintained constant at all ranges, the improvement which comprises:
means connected to the STC function generator for maintaining the noise level in the main signal channel constant at all ranges,
said noise level maintaining means comprising
circuit means connected to the noise generator and controlled by the STC function generator for injecting noise into the main signal channel,
said circuit means being a bridge circuit having two arms,
voltage amplitude and phase adjusting means being connected in one arm and,
an attenuator controlled by the STC function generator being connected in the other arm.

6. The combination of claim 5 wherein means for squaring the STC function is connected between the STC function generator and the attenuator.

7. The combination of claim 6 wherein said bridge circuit comprises:
means connected to the noise generator for dividing the generator output into two equal signals and feeding one signal to each arm;
means for combining the signals after they have passed through the arms to produce the noise signal to be injected; and,
means for coupling the noise signal to be injected to the main signal channel.

8. The combination of claim 7 wherein:
the attenuator comprises a pin diode attenuator; and, the STC function squaring means is a linear amplifier having a gain of two.

* * * * *